July 8, 1958  A. C. AUER  2,842,359
PNEUMATIC CUSHION FOR MOTOR VEHICLES
Filed Oct. 10, 1955
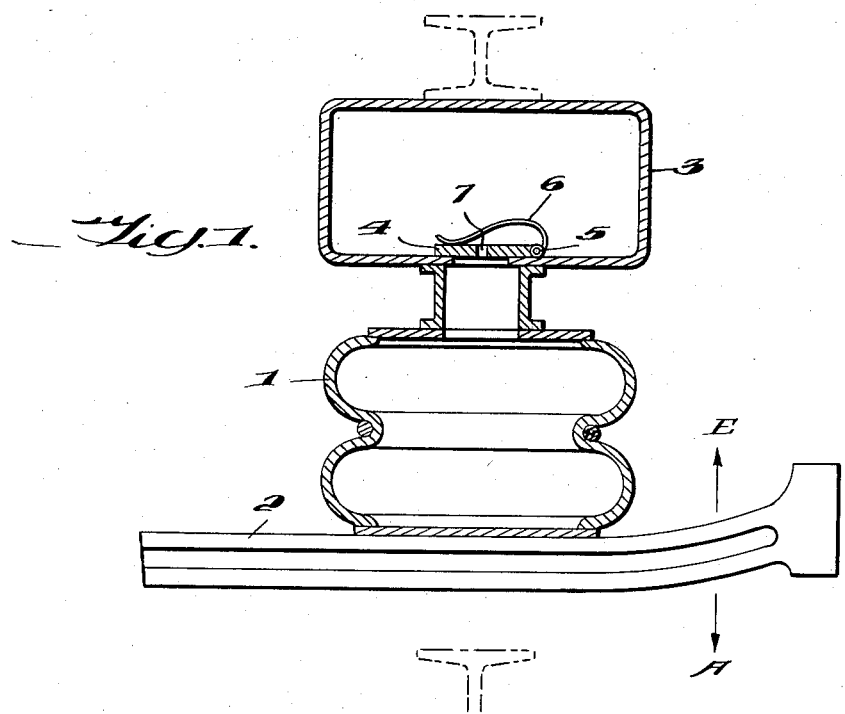
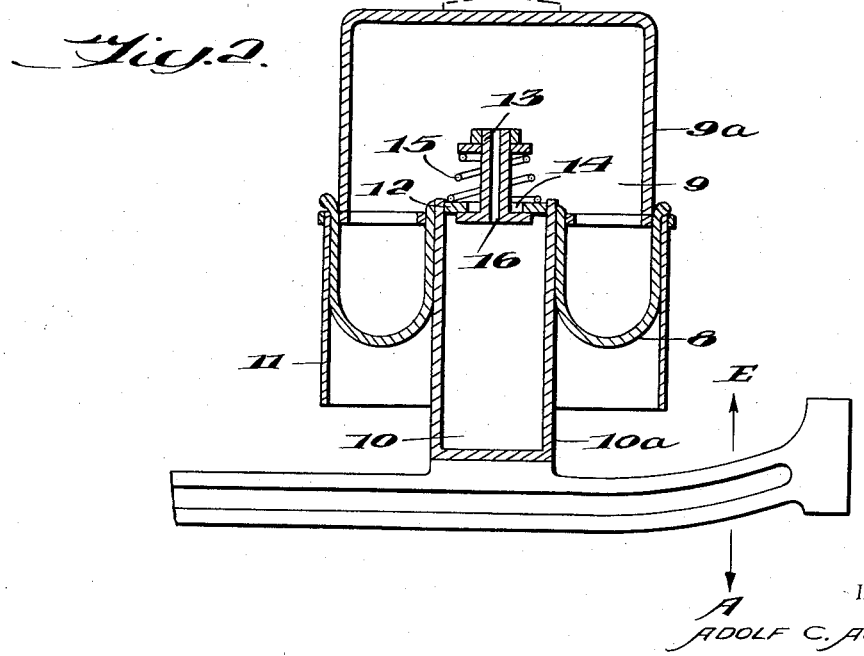
INVENTOR
ADOLF C. AUER,
BY *Bailey, Stephens & Huettig*
ATTORNEYS United States Patent Office 2,842,359
Patented July 8, 1958

2,842,359

PNEUMATIC CUSHION FOR MOTOR VEHICLES

Adolf Christian Auer, Nurnberg, Germany, assignor to Maschinenfabrik Augsburg-Nurnberg, A. G., Nurnberg, Germany Application October 10, 1955, Serial No. 539,600

Claims priority, application Germany October 14, 1954

2 Claims. (Cl. 267—65)

This invention relates to vehicular springs. In particular, the invention is directed to a pneumatic cushion for a vehicle.

Pneumatic cushions for motor vehicles, and in particular for heavy buses and the like, do not have any natural or inherent dampening, and accordingly such must be provided.

The object of the instant invention is to produce a dampening mechanism for pneumatic cushions so that smaller and less expensive shock absorbers can be employed in connection with the pneumatic air cushions.

In general, the object is obtained by arranging a throttle device between an air cushion and an air chamber. Whereupon, when the air cushion is compressed, a large air passage is between the cushion and the air chamber, and when the air cushion is inflated, the air passage from the air chamber to the air cushion is small.

The means by which the objects of the invention are obtained are described more fully with reference to the accompanying drawings, in which:

Figure 1 is a cross-sectional view through a bellows type of air cushion, and

Figure 2 is a cross-sectional view through a diaphragm piston type of air cushion.

As seen in Figure 1, the air cushion 1 is of a bellows type, and is mounted upon vehicle axle 2. The upperside of the bellows is connected by a neck portion to an air chamber 3, which is secured to the vehicle frame, and thus the bellows and air chamber together are equivalent to a spring. A flap 4 is secured by a hinge 5 to the air chamber, and covers the mouth to the neck portion. The flap is maintained in closed position by a spring 6 which exerts only a light pressure on the flap. A passage 7 extends through flap 4 so that bellows 1 and chamber 3 are always in communication.

If the vehicle axle rises as indicated by arrow E, the air is forced from bellows 1 through the neck portion and opens flap 4 against the pressure of spring 6 so that the air from bellows 1 is received within chamber 3. Upon downward movement of the axle in the direction of the arrow A, flap 4 closes, and air is returned to bellows 1 through passage 7. Flap 4 therefore produces a dampening means for bellows 1. In other words, upon compression of the bellows 1, the air flows through a larger opening, than it does when the bellows 1 is expanded. Upon compression of bellows 1, the throttle effect is reduced by reason of the opening of flap 4. When the air is returned through passage 7, it is throttled, and a dampening action obtained for the bellows 1. It is apparent that other types of valves, such as poppet or ball valves, may be substituted for flap valve 4.

In Figure 2 the air cushion is composed of two cup-like air chambers 9 and 10 contained within an upper housing 9a inserted over a lower compartment 10a. The lower edge of housing 9a and the upper edge of compartment 10a are joined together by means of an annular diaphragm piston 8 of U-shape cross-section, with the inner edge of the diaphragm secured to the upper edge of the compartment 10a, and the outer edge of the diaphragm secured to the lower edge of housing 9a, to form an airtight flexible joint between air chambers 9 and 10. A skirt 11 depending from housing 9a encloses piston 8. The upper end of compartment 10a is closed off by cover 12, with the cover, the lower edge of housing 9a and the upper edge of compartment 10a all lying in substantially the same plane in the normal position of the pneumatic cushion. An opening 14 in cover 12 has a valve 13 therethrough which is radially spaced from the wall of the opening, and to which is secured a flange which extends beneath cover 12 to close off the opening. Spring 15 surrounding the stem of valve 13 serves to keep the valve in normally closed position, and this stem is hollowed to form an axially extending passageway 16.

When the axle rises in the direction E, valve 13 is opened, so that the air pressure between the two chambers rapidly becomes equalized. When the axle drops in the direction of the arrow A, valve 13 is closed, so that air can pass only through the passage 16, the air being thereby throttled, and the pneumatic cushion dampened.

Having now described the means by which the objects of the invention are obtained, I claim:

1. A pneumatic cushion for a vehicle spring support comprising a lower air chamber compartment adapted to be seated upon a vehicle axle, an upper air chamber housing adapted to be secured to a vehicle frame and inverted over said compartment and having its lower edge laterally spaced from the upper edge of said compartment, an annular diaphragm of U-shape cross-section having its outer edge secured to said housing lower edge and its inner edge secured to said compartment upper edge, a cover on said compartment, said housing lower edge, said cover, and said compartment upper edge all lying in substantially the same horizontal plane, and air choke valve means mounted on said cover for restricting air flow through said cover upon expansion of the pneumatic cushion.

2. A pneumatic cushion as in claim 1, said air choke valve means comprising an opening in said cover, a hollow valve stem extending through said opening and radially spaced from the side thereof, a flange on the end of said stem and extending beneath said cover to close said opening, and spring means for holding said valve in normally closed position.

References Cited in the file of this patent

UNITED STATES PATENTS

| | | |
|---|---|---|
| 1,130,656 | Annable | Mar. 2, 1915 |
| 1,133,337 | Tinkham | Mar. 30, 1915 |
| 1,516,004 | Eckrode et al. | Nov. 18, 1924 |
| 2,017,419 | Mercier | Oct. 15, 1935 |
| 2,537,637 | Candlin et al. | Jan. 9, 1951 |
| 2,694,569 | Gouirand | Nov. 16, 1954 |
| 2,713,498 | Brown | July 19, 1955 |